Figure 1:
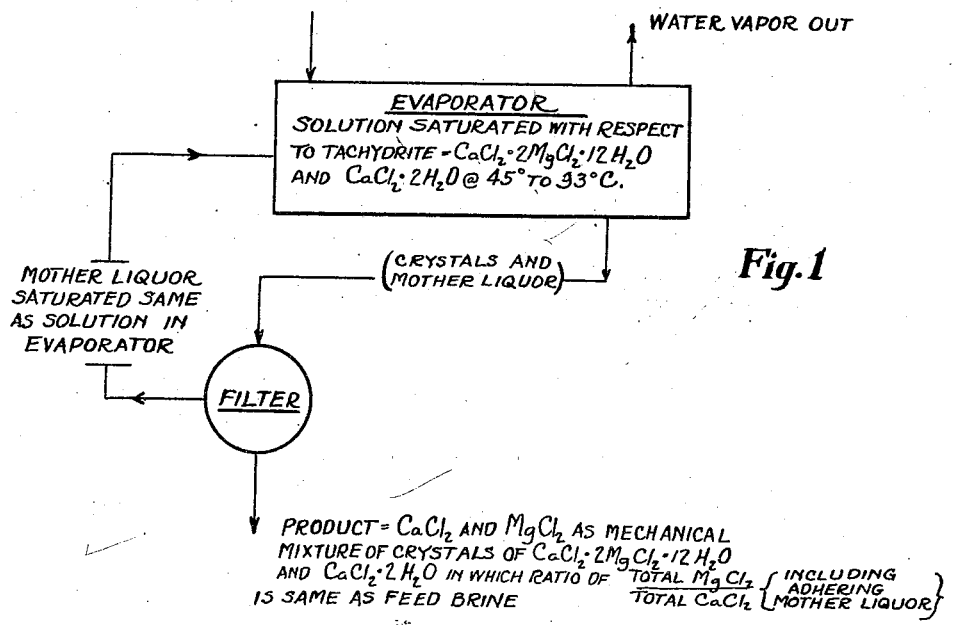

March 17, 1931. W. R. COLLINGS ET AL 1,796,886
CALCIUM MAGNESIUM CHLORIDE AND METHOD OF MAKING SAME
Original Filed March 7, 1928 2 Sheets-Sheet 2

INVENTORS
William R. Collings and
BY John J. Shafer.
Fay, Oberlin & Fay.
ATTORNEYS Patented Mar. 17, 1931

1,796,886

UNITED STATES PATENT OFFICE

WILLIAM R. COLLINGS AND JOHN J. SHAFER, OF MIDLAND, MICHIGAN, ASSIGNORS TO THE DOW CHEMICAL COMPANY, OF MIDLAND, MICHIGAN, A CORPORATION OF MICHIGAN

CALCIUM-MAGNESIUM CHLORIDE AND METHOD OF MAKING SAME

Original application filed March 7, 1928, Serial No. 259,869, now Patent No. 1,738,492. Divided and this application filed November 4, 1929. Serial No. 404,529.

The present improvements relate more particularly to a method of crystallizing from solutions saturated with hydrated metallic chlorides, and specifically chlorides of calcium and magnesium, a product containing such chlorides as a mechanical mixture of crystals of hydrated chlorides, either single or double or both.

While not necessarily limited thereto, the present improved process finds particularly valuable application in the working up of the end liquors that result from the treatment of natural brines which, in addition to sodium chloride, contain calcium chloride and magnesium chloride in solution together. As a step in such treatment, the separation of sodium chloride or common salt has long been practiced according to well known methods, and one approved method for the recovery and separation from the residual brine of calcium chloride and magnesium chloride, were thus found present in solution together, is disclosed and claimed in U. S. Letters Patent No. 1,627,068 to A. K. Smith and C. F. Prutton, dated May 3, 1927. However, in all such processes there still remains a residual mother liquor that contains the chlorides in question in varying amounts.

One object of the present improved process, accordingly, is to enable the working up of such end liquor at any stage in the general process of treating brines of the type in question where the separation of the individual chlorides is discontinued, whether for commercial or other reasons.

A further object is to obtain a product consisting of a mixture of such calcium and magnesium chlorides in the form of a free pouring, non-caking, granular mechanical mixture of their hydrated chlorides in a wide range of ratios corresponding to that of the end liquors utilized in the process. This non-caking, free pouring condition is preferably obtained by superficially drying such product in accordance with U. S. Letters Patent No. 1,597,121 to P. Cottringer and W. R. Collings, dated February 17, 1925, but, if desired, the drying step may be carried further and to any desired extent for the purpose of standardizing the content of anhydrous chlorides present in the product at such percentage as may be desired, e. g., 75 per cent., 80 per cent., etc. Accordingly, although the ratio of the two chlorides in the product may vary from time to time with a varying ratio thereof present in the available end liquor, which constitutes the feed brine for the process, nevertheless the anhydrous content of the product may be held at a constant figure for the purpose of yielding a standardized quality of mixed product.

To the accomplishment of the foregoing and related ends, the invention, then, consists of the steps and product hereinafter fully described and particularly pointed out in the claims, the annexed drawing and the following description setting forth in detail several approved modes of carrying out the process and corresponding modifications in the product obtained, such disclosed modes and products, however, representing but several of the various ways in which the principle of the invention may be used.

In said annexed drawing:—

Figure 2:
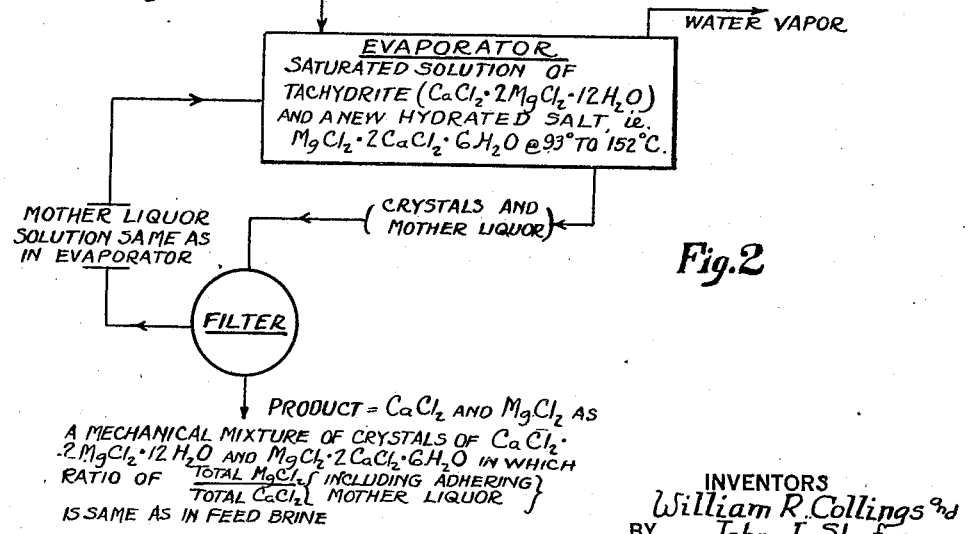
Figure 3:
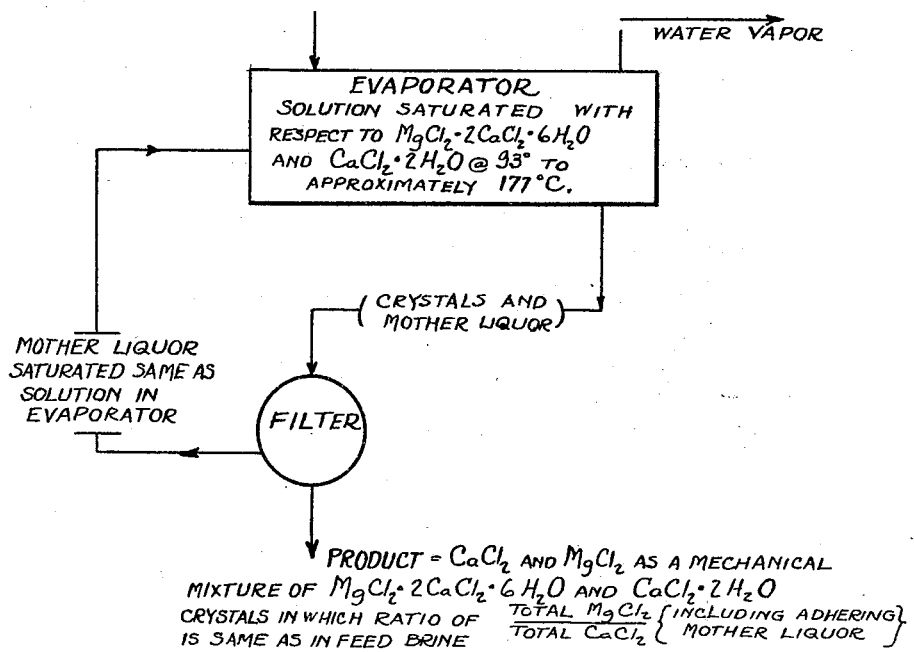

Fig. 1 is a diagrammatic representation, somewhat on the order of a flow sheet, showing in proper sequence the principal steps involved in carrying out one form of our improved method or process; and Figs. 2 and 3 are similar flow sheets or diagrams illustrating modifications in such method or process.

Briefly stated, our improved process involves treating a brine containing calcium and magnesium chlorides in any ratio of

by crystallization methods, whereby the calcium and magnesium chlorides are obtained as a mixture of hydrated chlorides in such proportion and composition that in the total analysis of the mixture and adhering mother liquor so obtained, the molecular ratio of

is the same as that in the feed brine, and the salts so obtained may be thereupon dried in a current of hot gases without melting.

Several hydrated chlorides and double chlorides may be separated from $$CaCl_2\text{-}MgCl_2$$

liquors depending on temperatures and mother liquor concentrations used. Thus some of the hydrated chlorides which may be separated to obtain the above mentioned object are: magnesium chloride hexahydrate, $MgCl_2.6H_2O$; tachydrite, $$2MgCl_2.CaCl_2.12H_2O;$$

a new compound represented by the formula, $MgCl_2.2CaCl_2.6H_2O$; and calcium chloride dihydrate, $CaCl_2.2H_2O$. By variously combining and proportioning the above mentioned salts, it is possible to obtain a mixture having any desired molecular ratio of $$\frac{MgCl_2}{CaCl_2}.$$

When a calcium chloride-magnesium chloride brine of any analysis is fed to a salting out evaporator operating under any constant vacuum or pressure, water is removed and as a result a solid phase, or phases, will separate out of solution. If the said solid phase, or phases, be continuously removed by a filter and the mother liquor continuously returned to the evaporator with the feed brine, the analysis of the mother liquor in the evaporator will approach and finally approximate a constant analysis. From this point on, the mother liquor analysis in the evaporator does not change substantially, the feed brine merely enters the evaporator, water is removed as vapor and the balance of the feed is removed as a mixture of hydrated chlorides and adhering mother liquor. This mixture may then be dried, as by hot air in a dryer, such as a dryer of the rotary kiln or shelf type, to obtain a dried, non-caking free flowing crystalline mixture suitable for applying to roads for dust prevention purposes, or other use.

In general, it is not important just what hydrates come out as the solid phase in the evaporator, when evaporating brine and returning the mother liquor separated from the crystals to the exaporator. The chief advantageous characteristics of the crystals, or crystal mixture, so obtained are, easy separation from the mother liquor and capacity for drying by hot gases without melting or balling up. For the above reason, the salting out temperature in the evaporator is best kept low by maintaining a high vacuum on the evaporator so as to make the crystal mixture obtained most easily separable from the mother liquor.

The three figures in the drawing, as stated, illustrate three different modifications of our method, or, more specifically, they show three specific ranges for feed brine composition and evaporator temperature, for each of which the particular hydrated end products thereby obtained are indicated.

Thus, assuming a brine to contain $CaCl_2$, $MgCl_2$, $NaCl$, and $H_2O$ in which the molecular ratio of $$\frac{MgCl_2}{CaCl_2}.$$

is less than 2 to 1, the preferred method of operation is illustrated in Fig. 1 and would be as follows:—

Evaporate the brine under vacuum to a concentration of approximately 40° Bé. and separate the 40° Bé. liquor from the salt, which is practically insoluble in this strength liquor. The $CaCl_2.MgCl_2$ liquor is then fed to a salting evaporator, operating under high vacuum (say 1″ mercury absolute pressure), in which water is removed as vapor and a thick crystal slurry of easy pumping consistency is obtained. This slurry is then pumped to a rotary suction filter which separates the mother liquor quite completely from the crystals. The crystals from the filter are handled as hereinafter described while the mother liquor is returned to the evaporator along with the feed liquor. After a certain period of operation the mother liquor in the evaporator will reach and remain at a constant composition of approximately 6% $MgCl_2$, 53% $CaCl_2$ and 41% $H_2O$ corresponding to a molecular ratio of $$\frac{.132 \text{ mole } MgCl_2}{1.0 \text{ mole } CaCl_2}$$

and $$\frac{4.77 \text{ mole } H_2O}{1.0 \text{ mole } CaCl_2}.$$

This mother liquor is saturated with tachydrite $(2MgCl_2.CaCl_2.12H_2O)$ and $$CaCl_2.2H_2O$$

and its saturated boiling point at 1″ absolute pressure is approximately 70° C., the evaporator operating temperature in this case.

The first crystals obtained when starting up the process as described will not contain a molecular ratio of $$\frac{MgCl_2}{CaCl_2}$$

equal to that in the feed liquor, unless the feed liquor happens to have the same $$\frac{MgCl_2}{CaCl_2}$$

ratio as that of the equilibrium mother liquor in the evaporator. However, after the equilibrium mother liquor concentration has been attained the proportions of $$CaCl_2.2H_2O, 2MgCl_2.CaCl_2.12H_2O,$$

and adhering mother liquor coming off the rotary suction filter will be such as to give a total analysis (.132MgCl$_2$.CaCl$_2$.4.8H$_2$O), the $$\frac{MgCl_2}{CaCl_2}$$

ratio of which is identical with that of the feed. It is obvious that, if the $$\frac{MgCl_2}{CaCl_2}$$

ratio in the feed liquor is nearly the same as that in the equilibrium mother liquor, the proportion of CaCl$_2$.2H$_2$O or of 2MgCl$_2$.CaCl$_2$.12H$_2$O may be zero, and that the material being removed by the rotary suction filter will consist of one of the above named hydrates and the adhering mother liquor in such proportion as to give a total analysis of identical $$\frac{MgCl_2}{CaCl_2}$$

ratio with that of the feed liquor.

After equilibrium conditions have been attained they may be maintained as in customary manner by suitably controlling the heat in-put to the evaporator or the rate of feed or both.

The damp crystals obtained from the rotary suction filter are then dried preferably in a current of hot gases in a rotary dryer to dry up the adhering mother liquor and surface dry the crystals to give a free flowing practically non-caking product.

In the modified method illustrated in Fig. 2, the ratio of magnesium chloride to calcium chloride in the feed brine may range from 2.00 to 0.50 and in such case, if the evaporation be carried on at a temperature from 93 degrees to 152 degrees C., the liquor in the evaporator will become saturated with tachydrite and with another hydrated double chloride which we believe to be newly discovered by us in this connection, represented by the formula MgCl$_2$.2CaCl$_2$.6H$_2$O. These two hydrated crystalline salts may be separated out in the same manner as described in connection with the first method and the resulting product, as before, will contain the two chlorides in the same ratio as they are present in the feed brine.

Referring to the further modification in our method or process illustrated in Fig. 3, the feed liquor here employed contains magnesium chloride and calcium chloride in a ratio lying between .43 and 0. Upon carrying out the evaporation of this liquor at a temperature between 93 degrees and 177 degrees C., the solution in the evaporator becomes saturated with respect to the before mentioned new hydrated salt, MgCl$_2$.2CaCl$_2$.6H$_2$O and CaCl$_2$.2H$_2$O, so that crystals of these salts separate out and form a product in which the ratio of the total magnesium chloride to the total calcium chloride is the same as in the feed brine just as before.

For any composition of feed liquor, there are one or more temperature ranges in which the above described process is operable for producing a product having the same $$\frac{MgCl_2}{CaCl_2}$$

ratio as that of the feed. Thus in some cases a feed brine of a given analyses may be worked up to a product of the same $$\frac{MgCl_2}{CaCl_2}$$

ratio by two different ways, that is by salting out two combinations of different hydrated chlorides. These various possibilities, together with one set of operating conditions suitable for working up any CaCl$_2$-MgCl$_2$ brine, are given in summary form in the following table which shows the general feed composition ranges, temperature ranges, components of product, and specific temperature, pressure and equilibrium mother liquor composition therefor, for one mode of working the process in all feed ranges, viz:—

| Solid phases salting out i. e. components of product | Approx. operable range of molecular ratio $\frac{MgCl_2}{CaCl_2}$ in feed to evaporator | Operable temperature range | Sample approximate operating conditions | | |
|---|---|---|---|---|---|
| | | | Temp. | Absolute pressure inches Hg | Approximate equilibrium mother liquor composition moles $\frac{MgCl_2}{CaCl_2}$ |
| 2MgCl$_2$.CaCl$_2$.12H$_2$O plus CaCl$_2$.2H$_2$O previously described. | $\frac{2}{1}$ to $\frac{0}{1}$ | Below 93° C. | 70° C. | 1″ | $\frac{.132}{1.00}$ |
| MgCl$_2$.2CaCl$_2$.6H$_2$O plus 2MgCl$_2$.CaCl$_2$.12H$_2$O. | $\frac{2}{1}$ to $\frac{.5}{1}$ | Above 93° C. | 120° C. | 10″ | $\frac{.245}{1.00}$ |
| MgCl$_2$.2CaCl$_2$.6H$_2$O plus CaCl$_2$.2H$_2$O. | $\frac{.5}{1}$ to $\frac{0}{1}$ | Above 93° C. | 130° C. | 12″ | $\frac{.038}{1.00}$ |

It may be observed that while according to the process of U. S. Patent 1,627,068 crystalline double salts of magnesium and calcium are produced for the purpose of increasing the ratio of the magnesium to calcium therein, and magnesium chloride, or calcium chloride, is finally separated therefrom as a single chloride, we produce mixtures of different double salts or mixtures of different hydrated salts, and then convert these into dried granular or crystalline products containing the mixed chlorides of magnesium and calcium in any desired ratio, e. g., in that ratio in which they may exist or may be available in the brine or mother liquor source.

From the foregoing exemplifications of the process, it will accordingly be seen that the latter enables the working up of brine ranging from a pure calcium chloride brine to one in which the ratio of magnesium chloride to calcium chloride is as high as 2.00. Correspondingly, the crystalline product obtained will range from calcium chloride di-hydrate to a mixture of hydrated salts of the single and double chlorides as indicated.

Furthermore, the product throughout this entire range of chloride mixture, it will be seen, is a mechanical mixture of hydrated single or double chlorides in granular form, which, upon superficial drying, constitutes a free pouring, non-caking, hygroscopic, granular product having very desirable properties. In short, our new process admirably solves the question of how to utilize and work up advantageously the mother liquors remaining from the production of pure magnesium chloride and/or pure calcium chloride, or both, from brines or liquors in which such chlorides are present in solution together. The recovery or separation of these purse salts may be carried out to any desired extent without degard to the ratio in which they are left present in the residual solution or mother liquor since the latter by means of the present process may be converted into the form of the mixed granular hydrated single or double chlorides, or both, as hereinbefore set forth.

The aforesaid hydrated salt mixtures we have found more easily separated by filtration or draining at all temperature ranges in the first method (Fig. 1) and at the lower temperature ranges in the second method (Fig. 2). Indeed they may be even centrifuged without the drawback of caking to a solid mass and they may be readily separated upon a rotary suction filter in a continuous manner corresponding with the approximate rate in which the salts are formed in the evaporator. The process, accordingly, lends itself admirably for continuous operation, employing an evaporator under reduced pressure and temperature control with continuous feed, continuous withdrawal of mother liquid and crystals, continuous separation on a filter with production of a continuous stream of product in moist, granular form and a like continuous stream of mother liquor for return to the evaporator. Moreover, the crystalline product thus separated may, if desired, be dried in a continuous drier.

This application is a division of our Patent 1,738,492, application filed Mar. 7, 1928.

Other forms of applying the principle of our invention may be employed instead of the ones here explained, change being made in the method or composition, provided the steps or ingredients stated by any of the following claims or the equivalent of such stated steps or ingredients be employed.

We therefore particularly point out and distinctly claim as our invention:—

1. In a method of making a product of the character described, the steps which consist in adding a solution containing a mixture of calcium and magnesium chlorides to a mother liquor saturated with respect to the hydrated double chloride, $MgCl_2.2CaCl_2.6H_2O$, and calcium chloride dihydrate, the molecular ratio of magnesium chloride to calcium chloride in such added solution lying between 0.50 and 0, and simultaneously evaporating such mother liquor to maintain the same approximately at such point of saturation.

2. In a method of making a product of the character described, the steps which consist in adding a solution containing a mixture of calcium and magnesium chlorides to a mother liquor saturated with respect to the hydrated double chloride, $MgCl_2.2CaCl_2.6H_2O$, and calcium chloride dihydrate, the molecular ratio of magnesium chloride to calcium chloride in such added solution lying between 0.5 and 0, and simultaneously evaporating such mother liquor at a temperature between 152° and 177° C., whereby such mother liquor is maintained approximately at such point of saturation.

3. As a new article of manufacture, a free flowing, non-caking mixture of hydrated chlorides of magnesium and calcium precipitated as crystals of the hydrated double chloride, $MgCl_2.2CaCl_2.6H_2O$, and calcium chloride dihydrated from a solution saturated with respect to such chlorides, such crystals being superficially dehydrated to the point where their tendency to cake together in the package is reduced.

Signed by us this 31st day of October, 1929.

WILLIAM R. COLLINGS.
JOHN J. SHAFER.